N. J. McLEOD AND C. F. RAINSFORD.
COLLAPSIBLE CRATE OR PACKING CASE.
APPLICATION FILED OCT. 15, 1919.
1,378,614.
Patented May 17, 1921.
2 SHEETS—SHEET 1.
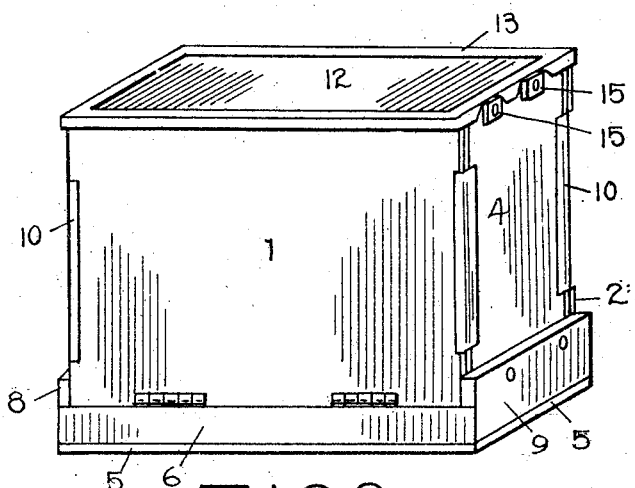
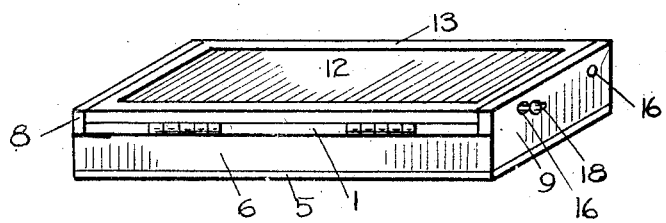
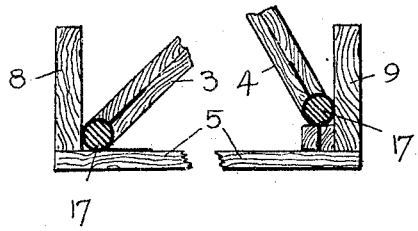
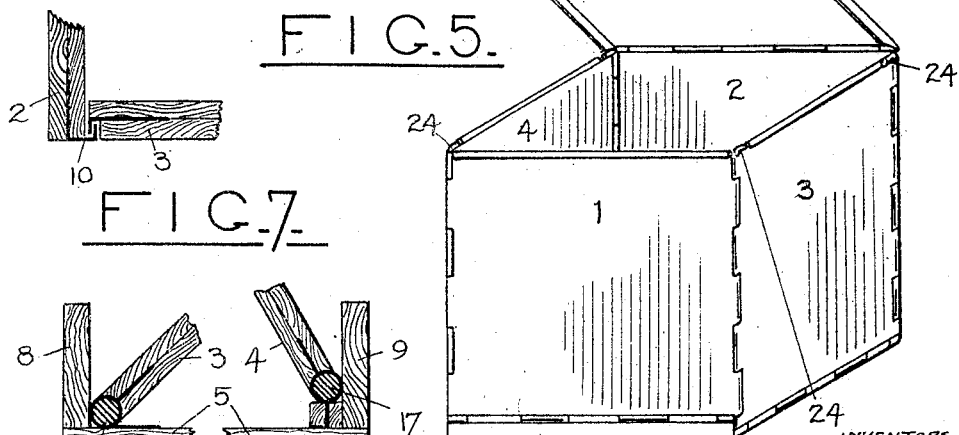
INVENTORS
Norman James McLeod,
Clarence Ferdinand Rainsford.
BY
ATTORNEYS N. J. McLEOD AND C. F. RAINSFORD.
COLLAPSIBLE CRATE OR PACKING CASE.
APPLICATION FILED OCT. 15, 1919.
1,378,614.
Patented May 17, 1921.
2 SHEETS—SHEET 2.
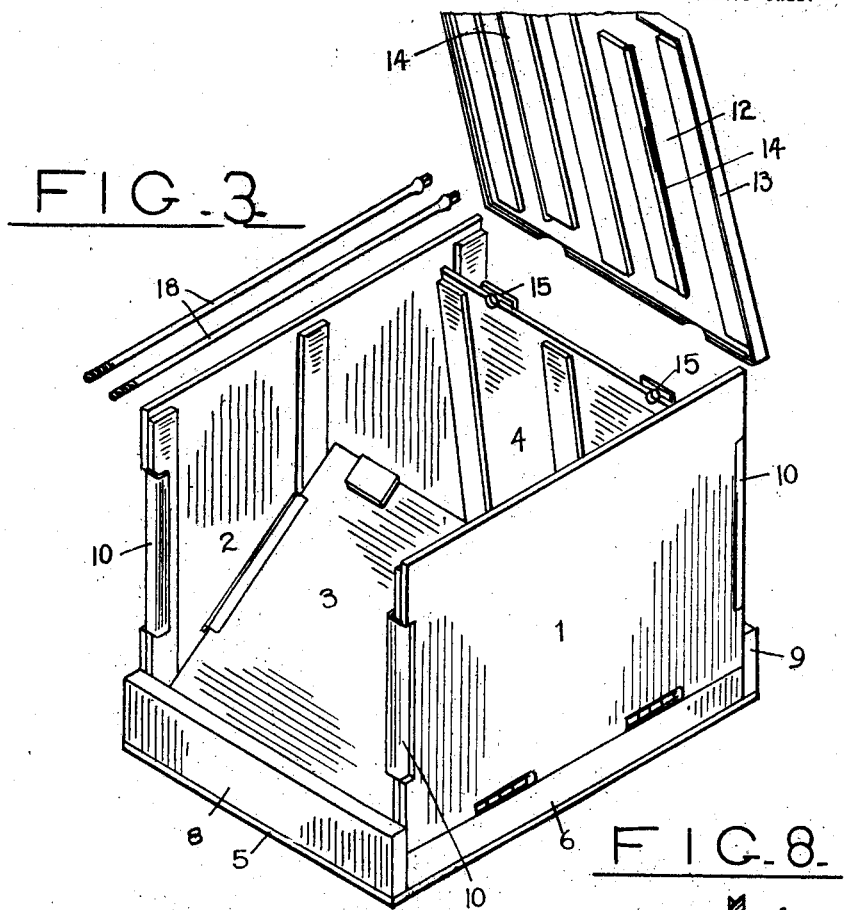
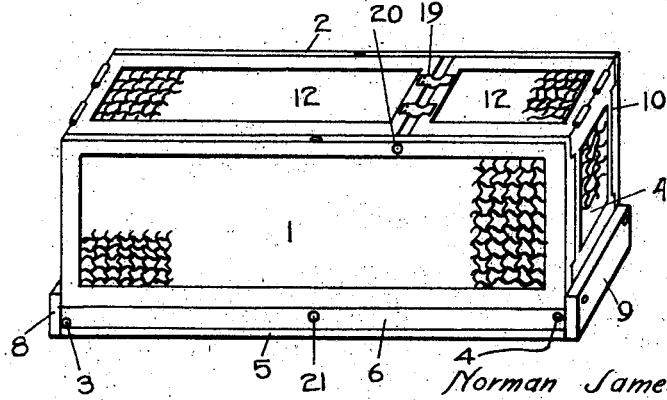
INVENTORS
Norman James McLeod,
Clarence Ferdinand Rainsford.
BY
ATTORNEYS.

UNITED STATES PATENT OFFICE.

NORMAN JAMES McLEOD AND CLARENCE FERDINAND RAINSFORD, OF ADELAIDE, SOUTH AUSTRALIA, AUSTRALIA.

COLLAPSIBLE CRATE OR PACKING-CASE.

1,378,614.  Specification of Letters Patent.  Patented May 17, 1921.

Application filed October 15, 1919. Serial No. 330,937.

*To all whom it may concern:*

Be it known that we, NORMAN JAMES MCLEOD and CLARENCE FERDINAND RAINSFORD, respectively a citizen of the United States of America and a subject of the King of Great Britain and Ireland, and residents, respectively, of the Eagle Hotel, Hindley street, and of 273 Rundle street, both in Adelaide, State of South Australia, Commonwealth of Australia, have invented a certain new and useful Improved Collapsible Crate or Packing-Case, of which the following is a specification.

This crate or case has been designed for packing, shipping and transporting goods, for exhibiting poultry and for other purposes, its especial feature being that, when empty, it can be collapsed or folded down into a small space for transit, thereby reducing the space required and consequent cost, and the liability to breakage.

According to our invention the sides and ends of the crate are attached by hinges or trunnions to a frame or tray formed of the crate bottom with shallow end and side pieces, so that when the crate is collapsed the sides and ends with the top fold down flat upon the bottom and are protected by the end and side pieces of the tray, but when erected they interlock and, with a locking device, hold one another firm, the said locking device being used also to lock the parts in position when collapsed. No nails, bolts, screws or ties are required to hold or fasten the crate either when erected or when collapsed.

In order that our invention may be more clearly understood we will describe the same with reference to the accompanying drawings in which—

Figure 1 is a side view showing a convenient form of our case erected as in use.

Fig. 2 is a side view showing it collapsed, one of the locking rods being shown as slightly withdrawn.

Fig. 3 is a perspective view showing the case partly erected, with the lid raised from the sides and ends.

Fig. 4 is a perspective view showing a modification of the case shown in Figs. 1, 2 and 3, the case being shown erected. This is especially designed for carrying and exhibiting poultry and animals.

Fig. 5 is a perspective view showing another modification of the case shown in Figs. 1, 2 and 3, the case being shown opened. This is especially designed for sheet metal biscuit or lolly tins or the like.

Fig. 6 is a sectional detail view showing the retaining clips whereby the ends are locked to the sides when erected.

Fig. 7 is a sectional detail view showing the hinging of the two ends to the tray.

Fig. 8 is a sectional detail view showing a corner of the crate shown in Fig. 4.

In the drawings Figs. 1, 2 and 3 we have shown a crate or case in which the length, breadth and height are approximately equal.

The sides 1 and 2, and the ends 3 and 4 are attached to a tray formed of the crate bottom 5 with low side pieces 6 and 7 and end pieces 8 and 9. The side piece 7 is not visible in the drawings.

The bottom edges of the ends 3 and 4 are attached by hinges, one near each end, to the floor 5 of the tray immediately against the end pieces 8 and 9 of the tray, see Fig. 7, the hinges of the one end 3 being at a lower level than the hinges of the other end 4 so that the former may be folded down flat upon the floor 5 of the tray and the latter may then be folded down flat upon the former.

The bottom edges of the sides 1 and 2 are attached by hinges, one near each end, to the tops of the side pieces 6 and 7 of the tray, one to each, the side piece 6 of the tray being made of such height that the side 1 hinged thereto may be folded down flat upon the top of the two folded down ends 3 and 4, and the other side piece 7 being made somewhat higher so that the side 2 hinged thereto may be folded down flat upon the side 1.

The two ends 3 and 4 when erected stand immediately against the two end pieces 8 and 9 of the tray, but the two sides 1 and 2 are flush inside and out with the two side pieces 6 and 7 of the tray. Furthermore the two end pieces 8 and 9 rise to such height that when the lid 12 is laid upon the folded down ends and sides the top of the lid is flush with the top of the end pieces 8 and 9 as shown in Fig. 2.

The hinges are made of diameter at least equal to the thickness of the material in the sides and ends, being made of complementary members of sheet metal wrapped around a central pin 17 see Fig. 7 and having their projecting wings housed in the wood or other material of which the parts of the crate are constructed.

To each end of the two sides 1 and 2 are secured retaining clips 10 of metal, which engage complementary clips on the ends 3 and 4 see Fig. 6 whereby the ends are locked to the sides when erected and any outward movement is prevented.

The case or crate may be constructed of wood or metal. In these figures the sides, ends and lid are shown as constructed of boards with connecting and strengthening cleats or battens, the wings of the hinges and of the clips being secured between the boards and the cleats. When the crate or case is made of metal the retaining clips and the hinges are made integral with the sides and ends.

The lid 12 is formed with cleats which rest upon the top of the cleats of the end and side pieces, and with a thin metal flanged edging 13 which fits over the outside of the ends and sides, while two shorter cleats carry tubular fittings 14 through which pass two locking rods 18. When erected the lid 12 rests upon and holds the ends 3 and 4 and the sides 1 and 2 against either inward or outward movement.

In the upper edges of the two ends 3 and 4 are eyes 15 which, when the case is erected, register with the tubular fittings 14 of the lid to take the locking rods 18.

The locking rods 18 are made with a head at one end and a screwthread at the other and when inserted through the eyes 15 and fittings 14 hold the whole securely locked in position.

When the case is collapsed the lid is placed upon the last folded side, the whole being held by the locking rods 18 passing through the holes 16 see Fig. 2.

Although locking rods are shown in the drawings as the means of locking the lid to the ends and sides, the lid can be securely held in position by strong locks placed in the lid the tongues of which engage slots in the sides and ends when erected, and in the end pieces 8 and 9 when collapsed. These would be operated by a key or keys. This would in no way interfere with the fitting of the lid, space being allowed for same.

Assuming our crate to have been opened and emptied it is collapsed for transport as follows. The one end 3, that with its hinge immediately against the bottom of the tray is folded down between the two sides 1 and 2 flat upon the bottom. The other end 4 is then folded down flat upon the end 3. The one side 1, that which is hinged to the top of the lower side piece 6, is then folded down upon the top of the end 4. The other side 2, that which is hinged to the top of the higher side piece 7, is then folded down upon the top of the side 1. The lid 12 is then laid upon the top of the side 2, and the rods 18 inserted through eyes 16 in the end piece 9 of the tray locking the whole together.

To set up the crate the movements are reversed.

Fig. 4 shows a modification of the crate shown in the other figures. In this the height is equal approximately to half the width, and the length is somewhat greater than twice the height. This crate has been designated especially for use as a poultry or animal coop.

In this construction the ends 3 and 4 and the sides 1 and 2 are attached by trunnions to a tray formed as before of the crate bottom 5 with low side pieces 6 and 7 and end pieces 8 and 9, while the lid 12 is formed in two parts and the two parts hinged to the two ends 3 and 4, one part to each end. The end 3 and the side piece 7 are not visible in the drawing.

The bottom edge of each of the ends 3 and 4 is attached by trunnions, one at each end, to the tray. The trunnions of the one end 3, each of which is formed of a projecting rounded or pin-like portion of the end, are immediately above the bottom 5 and fit into sockets in the side pieces 6 and 7 of the tray. The trunnion pins of the other end 4 also fit into sockets in the side pieces 6 and 7 of the tray but are higher up by the thickness of the end, so that when folded up or collapsed the first end 3 with its attached part of the lid 12 lies immediately upon the bottom 5, and the second end 4 with its attached part of the lid 12 lies immediately upon the end 3 and the part of the lid attached thereto.

The bottom edge of each of the sides 1 and 2 is attached by trunnions, one at each end, to the tray immediately over the top of the side pieces 6 and 7 thereof, each trunnion being formed by a projecting rounded or pin-like portion of the side 1 or 2 held in the end piece 8 or 9 of the tray.

To each vertical end of each side 1 and 2 of the crate or coop, preferably a little down from the top, is secured the retaining clip 10 with a return flange upon its projecting end see Fig. 8, which clips engage and hold the ends 3 and 4 to the sides 1 and 2 when the crate is erected.

In constructing a crate of sheet metal the retaining clips 10 may be formed by stamping out or leaving a projecting flange when stamping or cutting the sides 1 and 2.

The lid 12 of the coop is formed in two somewhat unequal parts for convenience in handling the birds or animals, the one part being attached at its outer edge by hinges to the top edge of the one end 3 of the crate, and the other part being similarly attached to the top edge of the other end 4 of the crate. To the inner side of each of the sides 1 and 2 and beneath the inner ends of the parts of the lid 12 are fastened supporting cleats (not visible in the drawing) upon which the parts of the lid rest when the crate is erected and against which they are held by the locking bar.

To the inner edge of one of the parts of the lid 12 are secured two metal clips 19 (which correspond to the tubular fittings 14 of Fig. 3) which register or line with two eyes 20 (which correspond to the eyes 15 of Fig. 3) in the upper edges of the two sides of the crate, one of such eyes being screw-threaded. Each clip 19 comprises a central trough and two side wings one of which wings is fastened to one part of the lid and the other wing rests upon the top of and holds the other part in place.

A locking rod 18 not shown in this figure, with a head at one end and a screwthread at the other, inserted through these eyes 20 and clips 19 holds the whole securely locked in position. To enable the parts of the crate to be locked together when collapsed, eyes 21 are provided in the side pieces 6 and 7 of the tray to hold the locking rod 18 upon the top of the collapsed members.

In order that they may not be injured in transport and to facilitate the stacking of a number of crates the eyes 20 and 21 and the rods 18 are sunk into the surfaces of the wood or metal of which the crate is constructed.

Assuming our coop to have been opened and emptied it is collapsed for transport as follows. The one end 3, that with its trunnions immediately against the tray bottom, with the attached part of the lid is turned down between the two sides 1 and 2 flat upon the bottom 5. The other end 4 with its attached part of the lid is then turned down flat upon the end 3 and its attached part of the lid. The two sides 1 and 2 are then turned inward and laid flat, the two together covering the end 4 with its attached part of the lid. The locking rod 18 is then inserted in the eyes 21 and the several parts are securely locked together.

To set up the coop for use the movements are reversed.

When made of sheet metal as for biscuit tins the crate or case will be constructed as shown in Fig. 5. It will have its lid 12 hinged to one of the sides 1 and 2 or ends 3 and 4 and made to fold either under or over. The hinges and the retaining clips are formed by flanging the material of the ends and sides. The ends are held to the sides by four slidable pins 24, one at each corner, which pass through tubular interlocking clips formed on the edges of the sides and ends. The heads of the pins 24 fit, as shown, into spaces which are left for the purpose at the flanged top edges of the ends.

In this case no locking rods or locks are required. The lid is flanged upon its three edges and these flanges fit snugly over the upper edges of the sides and ends.

In order to collapse the crate the four slidable pins 24 are withdrawn from the ends and sides, and when they have been parted the pins are replaced in the slips of the ends only. The end 3 is first folded down upon the bottom of the tray, the end 4 is folded down thereon, the side 2 with lid 12 attached is folded down on to the end 4 and the lid turned back upon the top of side 2, and finally the side 1 is folded down flat within the flange of the lid.

Crates and cases constructed as described above have no clips, thumbscrews, supporting rods or other fitting on the outside. There is nothing which can be knocked or torn off, both inside and outside being free from any fitting, leaving the edges and sides smooth and free from protruding parts. When closed the case or crate collapses into a frame, and the whole is held secure by the same locking device as when erected, there being no loose or spare parts to pack away when collapsed.

What we claim as our invention is:—

1. A collapsible crate or case comprising; a tray formed of the bottom of the crate and shallow side and end pieces rigidly fastened thereto; ends hinged to the bottom of the tray adjacent to the end pieces of the tray and adapted to fold down the one upon the bottom of the tray and the second upon the first; sides hinged to the top of the side pieces of the tray and adapted to fold down the one above the upper end piece and the second above the first; a lid made in two parts each part being hinged at one edge to the top of one of the ends; supporting cleats secured to the inner side of the sides near their top edges, and two metal clips each comprising a central trough and two side wings, one of which wings is fastened to one part of the top and the other of which rests upon the other part of the top; and a locking rod which is carried, when the crate is erected, by two eyes in the upper edges of the side of the crate and, when the crate is collapsed, by two eyes in the side pieces of the tray.

2. A collapsible crate or case comprising; a tray formed of the bottom of the crate and shallow side and end pieces rigidly fastened thereto; ends hinged to the bottom of the tray adjacent to the end pieces of the tray and adapted to fold down the one upon the bottom of the tray and the second upon the first; sides hinged to the top of the side pieces of the tray and adapted to fold down the one upon the upper end pieces and the second upon the first; said hinges being made of diameter at least equal to the thickness of the material in the sides and ends, being made of complementary members of sheet metal wrapped around a central pin and having their projecting wings housed in or integral with the material of which the parts of the crate are constructed.

NORMAN JAMES McLEOD.
CLARENCE FERDINAND RAINSFORD.

Witnesses:
ARTHUR GORE COLLISON,
KATHLEEN MARY COLLISON.

It is hereby certified that Letters Patent No. 1,378,614, granted May 17, 1921, upon the application of Norman James McLeod and Clarence Ferdinand Rainsford, of Adelaide, South Australia, Australia, for an improvement in "Collapsible Crates or Packing-Cases," were erroneously issued to the inventors said McLeod and Rainsford, as joint owners of said invention, whereas said Letters Patent should have been issued to *Clarence Ferdinand Rainsford*, as assignee of the *entire interest* in said invention, as shown by the records of assignments in this office; and that the said Letters Patent should be read with this correction therein that the same may conform to the record of the case in the Patent Office.

Signed and sealed this 6th day of September, A. D., 1921.

[SEAL.]

KARL FENNING,
*Acting Commissioner of Patents.*

Cl. 217—15.